United States Patent [19]

Citron et al.

[11] Patent Number: 4,555,699
[45] Date of Patent: Nov. 26, 1985

[54] DATA-ENTRY SYSTEM

[75] Inventors: Alan L. Citron, Winchester; Thomas W. F. Lindquist, Boston; William E. Popp, Walpole, all of Mass.

[73] Assignee: Bancware, Inc., Stoughton, Mass.

[21] Appl. No.: 456,611

[22] Filed: Jan. 10, 1983

[51] Int. Cl.[4] .............................................. G09G 1/00
[52] U.S. Cl. .................................... 340/707; 340/706; 340/709; 340/734; 340/747; 178/18
[58] Field of Search ............... 340/706, 707, 708, 709, 340/710, 721, 724, 734, 722, 746; 178/18

[56] References Cited

U.S. PATENT DOCUMENTS

| | | | |
|---|---|---|---|
| 3,732,557 | 5/1973 | Evans et al. | 340/710 |
| 4,022,969 | 5/1977 | McKinlay et al. | 340/710 |
| 4,145,754 | 3/1979 | Utzerath | 340/706 |
| 4,193,122 | 3/1980 | Bowers | 340/722 |
| 4,231,032 | 10/1980 | Hara et al. | 340/734 |
| 4,302,755 | 11/1981 | Pisani et al. | 340/734 |
| 4,396,977 | 8/1983 | Slater et al. | 340/706 |
| 4,464,656 | 8/1984 | Nakamura | 340/734 |

Primary Examiner—Gerald L. Brigance
Attorney, Agent, or Firm—Cesari and McKenna

[57] ABSTRACT

A processor (18) receives signals from an electronic tablet (10) that represent the positions of a stylus (12) on the tablet surface. The processor operates a cathode-ray tube (20) to display the locations represented by the tablet signals and present scales for interpreting the display as values of a function. It also stores the quantitative data represented by the display in accordance with the scales. A user can therefore enter quantitative data in an analog manner, which is more natural in many instances.

10 Claims, 12 Drawing Figures

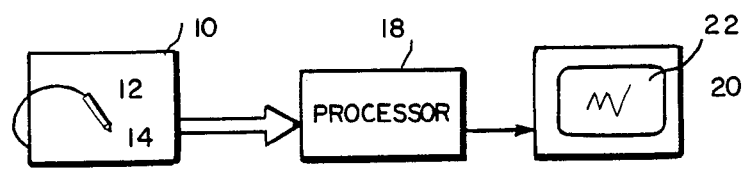
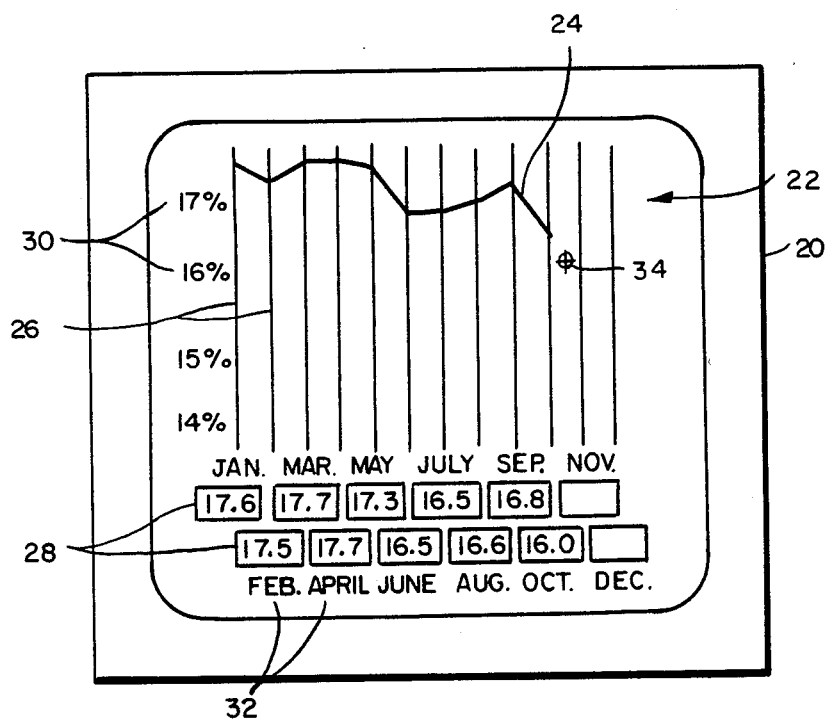
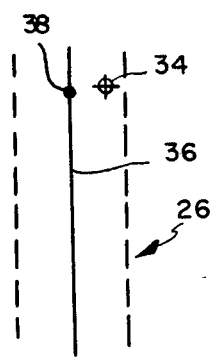

DATA-ENTRY SYSTEM

BACKGROUND OF THE INVENTION

The present invention is directed to data-entry devices.

As the computer field advances, it is becoming increasingly apparent that the limiting factor in various systems is the human being who must ultimately enter data. This is particularly true of the more-interactive systems.

Typically, quantitative data, such as financial information and physical quantities, are entered in an interactive system by operation of a keyboard, sometimes in response to prompting messages from the system. These prompting messages reduce the amount of learning the user must do before he can effectively enter data. He often needs to know very little about operating the system other than how to manipulate the keys of an ordinary keyboard. Thus, efficiency is increased as the user is able to shift his emphasis from how to enter data to concentrate on what the data are.

Even the relatively simple function of operating a keyboard, however, can present a barrier to the user, because this type of entry is not always the most natural. An object of the present invention, therefore, is to enable the user to enter quantitative data in such a way as to enable him to concentrate on the information being entered rather than on the mode of entry.

SUMMARY OF THE INVENTION

The foregoing and related objects are achieved in an information-display system having a two-axis data-entry device, such as an electronic tablet, and a two-axis display device such as the screen of a cathode-ray tube, or CRT. The data-entry device is of the type that receives information in the form of the location of a stylus on its data-entry surface and generates location signals representing the location in terms of axis coordinates.

A computer receives these location signals and then operates the CRT to generate a display that reflects the stylus position. The computer also provides a scale for each of the axes on the CRT screen so that the display represents values of a function of an independent variable. The computer also stores for concurrent or later use the values of the function and independent variable indicated by the analog display in accordance with the scales. Thus, quantitative data are entered in the natural way that had been used previously only for entry of graphic data.

BRIEF DESCRIPTION OF THE DRAWINGS

These and further features and advantages of the present invention are described in connection with the accompanying drawings, in which:

FIG. 1 is a block diagram of an embodiment of the present invention;

FIG. 2 depicts the display screen of a cathode-ray tube employed in the illustrated embodiment of the present invention;

FIG. 3 is a detailed view of one of the active zones of the display of FIG. 2;

DETAILED DESCRIPTION OF THE PREFERRED EMBODIMENTS

Figure 4:
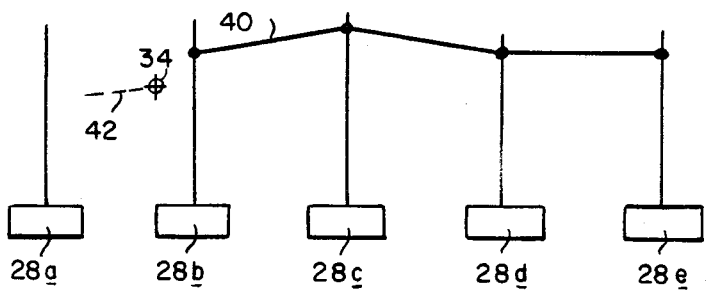
FIGS. 4-9 are diagrams illustrating a sequence of displays on the screen of the CRT.

In the exemplary system of FIG. 1, an entry tablet 10 including a stylus 12 generates signals representing the position of the stylus 12 when it is near an entry surface 14 of the tablet 10. These signals are transmitted along lines 16 to a processor 18, which responds, in a manner that will be set forth below, to operate a cathode-ray tube 20 having a display surface 22. The position of the stylus 12 is reflected on the display 22.

The FIG. 1 diagram depicts only one of many equivalent arrangements for entering the data in an analog manner. There exist systems, for instance, in which the entry surface 14 and the display surface 22 are the same; the user "writes" on the surface of a cathode-ray tube with a light pen, and the CRT generates images reflecting the entered information. Additionally, not all systems will employ a stylus or a light pen; the location-indicating device can even be the user's finger.

FIG. 2 depicts a sample display that can be produced by the illustrated embodiment of the present invention. Positions on the display surface 22 correspond to positions on the entry surface 14. Curves drawn on the surface represent functions in the usual manner, in which distance of a point from a vertical axis represents the value of an independent variable, such as time, and its distance from a horizontal axis represents the value of a function of the independent variable, such as mortgage interest rates.

A curve 24 is depicted on the display surface 22 as a connected sequence of line segments. These segments connect adjacent spaced vertical lines 26. The vertical lines 26 represent active zones. In the illustrated embodiment, it is possible to enter values of the function only at the predetermined discrete values of the independent variable represented by the vertical lines 26. For instance, if the different lines 26 represent months of the year, it is possible to make entries for January, February, or March, but not for March 27th. The system automatically draws line segments between entries at the discrete independent-variable values. This is why the curve 24 is a sequence of line segments.

Below each line 26, the screen 22 displays a box 28 that contains a digital readout of the analog value displayed at its associated vertical line. This digital readout 28 supplements legends 30 that indicate values on the vertical scale. A legend 32 near each box indicates the month of the year that the associated vertical line 26 represents.

When the stylus 12 is near enough to the surface 14 of the tablet 10, cross hairs 34 appear on the surface 22 of the CRT. In FIG. 2, no line segment extends to the position of the cross hairs 34. This is because the illustrated system only draws lines between points entered at the active zones. Thus, the system recognizes the position of the stylus when it is at a point between these active zones only by displaying the cross hairs. It is only when the stylus reaches an active zone and is depressed on the surface of the tablet, as will be described in more detail below, that the system draws a data point, and possibly a line, on the screen.

One of the active zones 26 is shown in more detail in FIG. 3, in which a center line 36 is shown representing the value of the independent variable for which entries can be made. A zone 26 around this value is sensitive to the presence of the cross hairs 34. If the cross hairs 34 are within the zone 26, a dot 38 can be made to appear on the center line 36 at the value of the dependent variable indicated by the height of the cross hairs 34. In order to enter a dot, the user presses the stylus 12 against the entry surface 14, thereby operating a switch in the stylus to send a signal to the processor 18. The zone is narrow, but it is wide enough to make it easy for the user to hit the corresponding location on the tablet 10 with his stylus. Even though the cross hairs 34 do not touch line 36, they cause a dot 38 to be displayed on it, and the dot 38 moves up and down with the cross hairs 38 so long as they stay within the active zone 26 and the stylus remains depressed. If the stylus is depressed outside the active zone, the cross hairs appear on the screen and move when the stylus is moved, but the position of the dot already entered in the active zone does not change.

The operation of the system will be described in more detail by reference to an exemplary sequence of displays depicted in FIGS. 4–9. Initially, an inactive curve 40 may be displayed on the screen. This may be a previous mortgage-rate curve, for instance, or a curve representing a quantity that depends on mortgage rates and has been computed on the basis of previously entered mortgage rates. In any event, it will typically be shown in a color different from that of the data to be entered, or it may be shown in a different fashion. For instance, it may be lighter or darker or dashed rather than solid.

FIG. 4 shows the cross hairs 34 being moved across the screen in a path depicted by dashed line 42. Although dashed line 42 appears in FIG. 4, it does not represent part of the display; only cross hairs are displayed in response to signals from the entry tablet 10 until the cross hairs 34 reach one of the active zones 26.

Figure 5:
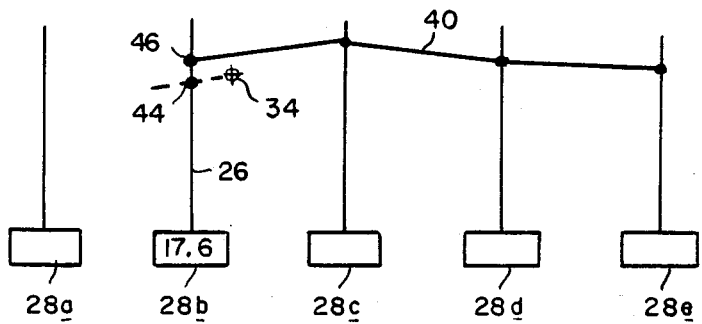
Figure 6:
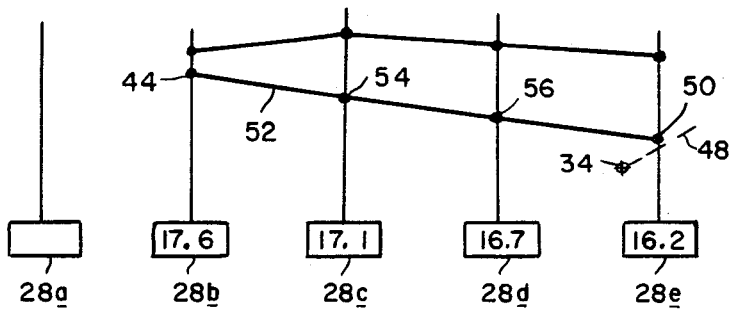

At the point in time illustrated in FIG. 5, the cross hairs have crossed one of the lines 26 with the stylus 12 depressed. The system has accordingly placed a dot 44 at the point of crossing. It should be noted that a dot 46 of the inactive curve 40 remains shown on the screen. Inactive curves ordinarily are not changed by entry of data.

In addition to presenting dot 44, the system also enters a digital indication of the value of the function in a box 28b associated with the active zone occupied by the dot. Thus, the user is given an accurate representation of the datum that he has entered. Movement of the cross hairs 34 away from dot 44 results in no line, and FIG. 5 thus shows only one active dot, dot 44.

In the example, the user picks up the stylus and holds it far enough above the tablet that the tablet does not detect the stylus position. With the stylus at this height, he moves it toward the right. During this movement, the tablet 10 sends no signals to the processor 18, and cross hairs accordingly are not shown crossing the screen from left to right. As a result, no dots are entered in response to this movement. The user then depresses the stylus on the right side of the screen and causes the cross hairs 34 to follow a path 48 depicted in FIG. 6. The result is display of a dot 50 in the rightmost active zone. The system then searches for any other active points, and it finds active point 44. It automatically draws a line from point 44 to point 48, thereby causing the entry of points 54 and 56 in the process. The result is that four data points are now displayed, and digital values are present in boxes 28b–e.

Figure 7:
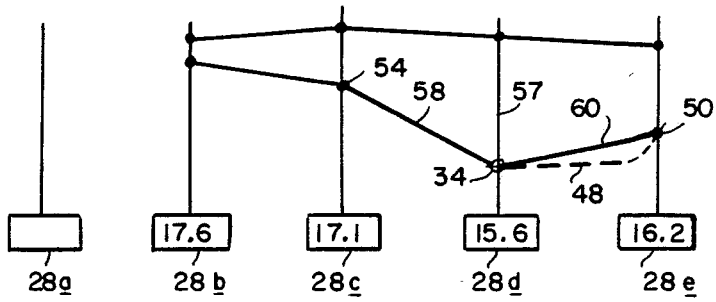

FIG. 7 shows the cross hairs 34 moving to active zone 57 with the stylus 12 depressed. When the cross hairs reach that zone, the active dot 56 (FIG. 6) previously displayed in that zone is "erased" by the system, and a new dot appears at the position of the cross hairs 34. In response to this entry, the system also automatically searches for active dots to the left and right of the newly entered dot and draws line segments 58 and 60 to the closest active dots 54 and 50, respectively.

Figure 8:
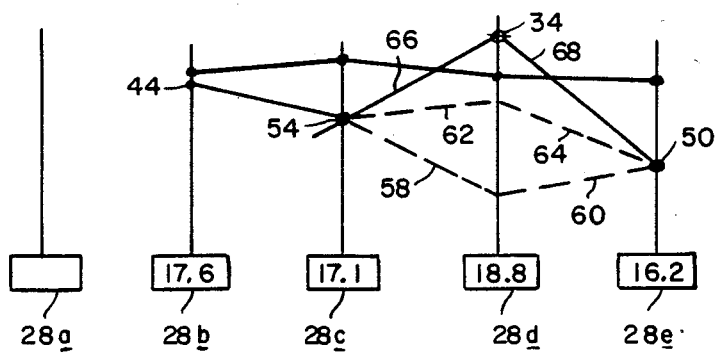

The user keeps the cross hairs in active zone 57 in order to modify the entry further, and he moves the stylus to cause the cross hairs to move upward on the screen. This is depicted in FIG. 8, in which the previous line segments 58 and 60 are depicted, as are line segments 62 and 64 that result from one of the intermediate positions of the cross hairs. Although FIG. 8 depicts only one pair of intermediate line segments 62 and 64, line segments are rewritten repeatedly as the cross hairs 34 move—so long as the stylus 12 is depressed on the surface 14—and previous line segments are continuously erased. This gives the display a "rubber band" effect; upon reception of each new set of signals from the tablet 10, a new point and new associated line segments are drawn. The curve thus appears to expand and contract as the cross hairs 34 move up the active zone.

The digital readout in block 28d is also incremented as the cross hairs move upward, and FIG. 8 shows it displaying a value of 18.8 as the cross hairs 34 rest in a position that results in line segments 66 and 68 extending to active points 54 and 50, respectively.

Figure 9:
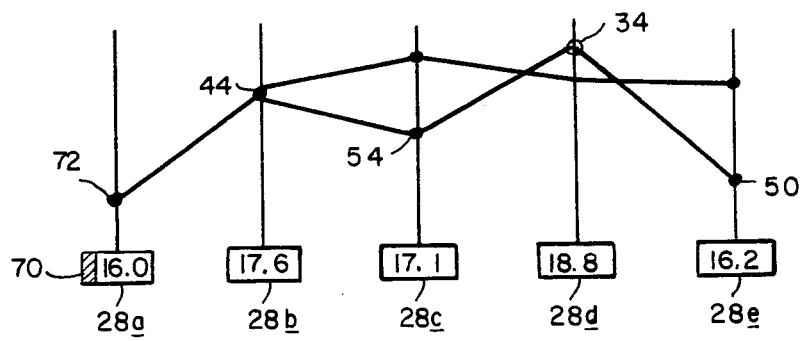

In the system of the preferred embodiment, the processor 18 can include a keyboard as an alternate means for entering data. This feature is depicted in FIG. 9, which shows a cursor 70 positioned in a digital-readout block 28a. The user can operate the keyboard to move the cursor among the several blocks 28a–e. When the cursor is in the desired position, the user types in the data that he wants entered, and the characters representing his keystrokes appear in block 28a. When the user is satisfied that the displayed number is the number that he wants to enter, he operates an appropriate key on the keyboard to enter it. The system accordingly displays a dot 72 in the associated active zone and draws a line segment between that dot and the closest active dot 44.

Figure 10:
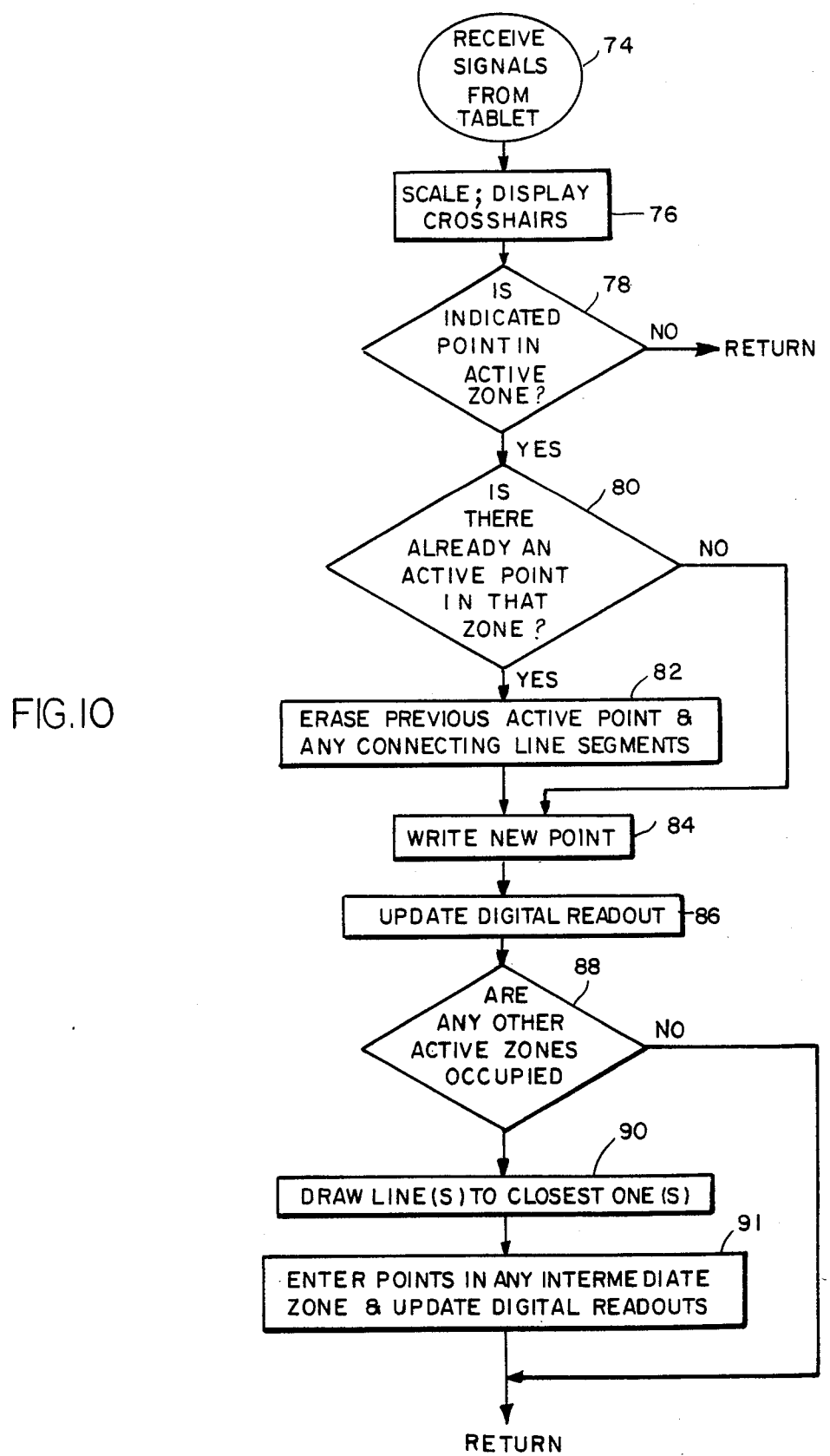
FIG. 10 is a flow chart illustrating the routine for displaying curves in response to analog entry of information.

A flow chart of the display operation is presented in FIG. 10, in which block 74 represents entry to the routine upon receipt of signals from the tablet. It should be noted at this point that it is possible in some systems for the tablet to send signals representing stylus locations at a rate that is too fast for the routine to be carried out for each location. In such a situation, the program calling the routine merely ignores the signals that are received while the routine is running. This is not a problem, because the user will ordinarily move the stylus slowly enough in the active zones, and it is immediately apparent if an intended data point is not entered.

When the processor 18 receives signals from the tablet, it performs a scaling operation, represented by block 76, to translate the signals into a position on the screen so that the cross hairs can be displayed. Decision block 78 represents the determination of whether or not the cross hairs are located in an active zone. If not, no further action is required, and the routine returns control to the main program.

If the cross hairs are in an active zone and the stylus is depressed, however, the routine must determine whether or not to erase previously entered points, and it hunts for another active point in the active zone. If there is already an active point in the zone indicated by the signals from the tablet, the routine deletes the previous active point, as block 82 indicates. The routine also deletes any line segments connected to the erased point, and the new point is then displayed, as block 84 indicates.

The steps represented by blocks 82 and 84 contribute greatly to the ease with which the user can enter data. The user can change an entry by merely moving the cross hairs to the desired point, and the old point is erased without any further action by the user. This is particularly helpful when the user moves the cross hairs up or down an active zone to reach a desired value of the function; he merely moves the cross hairs until the block below them displays the desired value, and he then raises the stylus.

When the new point is displayed, the system translates the position into a digital quantity, as block 86 indicates, and a new value is displayed in the block associated with the active zone.

Block 88 represents the determination of whether there are active points occupying any other active zones. If so, lines must be drawn from the new point to the closest point or points, as block 90 indicates. If the new line segment crosses any active zones, points must be entered in those zones also, and their digital readouts must be updated. This function is represented by block 91. Control is then returned to the main program.

Figure 11:
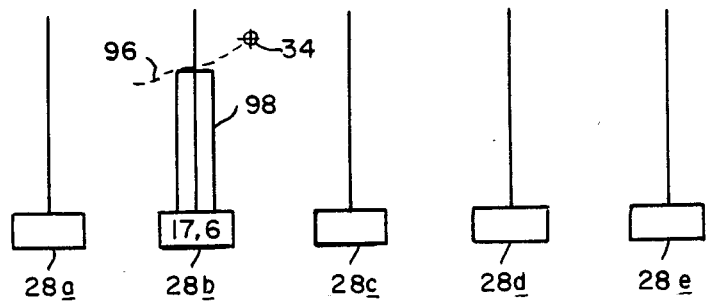
FIGS. 11 and 12 are diagrams of a sequence of displays produced in an alternate version of the illustrated embodiment.
Figure 12:
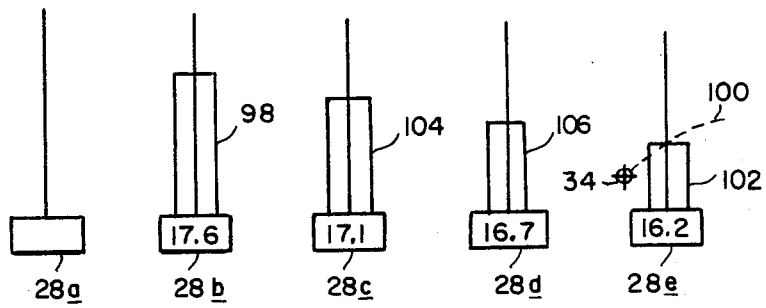

The analog representations of the entered data can be in forms other than curves in systems employing some of the teachings of the present invention. Such a system is depicted in FIGS. 11 and 12, which depict displays of a system for generating bar graphs. A dashed line 96 represents the path of cross hairs 34, which cross one of the active zones, and the system generates a bar 98 in response. Additionally, it displays the digital value in the corresponding block 28b. The path of the cross hairs 34 is similar to their path in FIG. 5. FIG. 12 depicts a path 100 that is similar to the path 48 shown in FIG. 6. As a result of this entry, the system displays another bar 102, and the associated digital readout 28e displays the digital value represented by the bar. The system can also be arranged to generate further bars 104 and 106 automatically in response to this entry, providing digital readouts corresponding to the heights of the bars.

Other variations of the invention are also possible. In the version shown, data are entered at only a small number of abscissa values. Clearly, the teachings of the present invention can be carried out even in a system that stores as many entries as the resolution of the data-entry device permits. In such a system, a digital display corresponding to the analog display would not be possible for each entered point, and so it might be eliminated. In the alternative, the digital displays could represent averages over ranges of values of the independent variable. A hybrid of such a system and the illustrated system might temporarily store as many points as the data-entry device permits until values have been entered throughout a range of the independent variable. The average value within that range could then be computed, and the values making up the average could be deleted. Thus, it is clear that many modes of entry in addition to the active-zone mode described above can be used to carry out the teachings of the present invention.

The present invention enables the user to enter quantitative data in a manner that is often more natural than the method that is necessary when more-conventional methods are used. Visualization of the entered data is enhanced because the system automatically draws a curve connecting the points. Also, the system employs the fact that a single-valued function is to be entered in order to simplify the entry of new data by automatically removing data that have been entered previously.

We claim:

1. A data-entry system comprising:
   A. a two-axis analog entry device that senses successive locations thereon of a location indicator and generates location signals representing the location in terms of a pair of axis coordinates whereby one may enter on said entry device a graphic representation of a function by positioning the location indicator at successive locations thereon;
   B. a two-axis display device operable to display thereon an independent-variable scale and a function scale and to indicate the values of a function of an independent variable for a series of values of the independent variable by generating thereon a graphical representation of the function that represents the values of the independent variable by distance from one axis in accordance with said independent-variable scale and represents the values of the function by distance from the other axis in accordance with said function scale; and
   C. control means for operating said display device to display said function and independent-variable scales, for receiving said location signals from said analog entry device, and for responding to the location signals by operating said display device to display said graphical representation and by storing a series of values of the function represented by said graphical representation.

2. A data entry and display system as recited in claim 1 wherein said control means establishes predetermined non-overlapping active zones on said display device, each active zone spanning a range of positions along the independent-variable scale but being associated with only a single value of the independent variable, said control means storing, as the value of the function at the independent-variable value associated with a given active zone, the function value indicated by the location signals most recently entered within that active zone, the control means further retaining in each active zone an entry image representing the stored value.

3. A data display and entry system as recited in claim 2 wherein said control means establishes predetermined inactive zones between successive active zones and wherein said control means operates said display device to omit from each inactive zone an image representing the location represented by the most recent location signals, other than the current location signals, indicating a location within that inactive zone.

4. A data display and entry system as recited in claim 3 wherein said control means operates said display device, in response to generation of an entry image, to draw a curve between that entry image and an entry image in an adjacent active zone.

5. A data display and entry system as recited in claim 4 wherein said curve is a straight line segment.

6. A data display and entry system as recited in claim 4 wherein said control means operates said display device, in response to generation of an entry image in an active zone, to draw a curve between that entry image and an entry image in a nonadjacent active zone.

7. A data display and entry system as recited in claim 6 wherein said control means displays an entry image at a point at which a curve that it draws between entry images crosses an active zone.

8. A data display and entry system as recited in claim 3 wherein said control means operates said display device to remove a previously entered entry image from an active zone automatically in response to generation of an entry image in that active zone.

9. A data display and entry system as recited in claim 2 wherein said control means operates said display device to produce thereon a digital representation of the value of the function indicated by an entry image.

10. A data display and entry system as recited in claim 2 further including key means manually operable to apply to said control means digital signals representing a function value and designating an active zone for that value, said control means responding to signals from said key means by operating said display device to generate an entry image representing the value indicated by said digital signals from said digital entry means at the active zone designated thereby.

* * * * *